US006853975B1

(12) United States Patent
Dirksen et al.

(10) Patent No.: US 6,853,975 B1
(45) Date of Patent: Feb. 8, 2005

(54) METHOD OF RATING EMPLOYEE PERFORMANCE

(75) Inventors: William P. Dirksen, Ann Arbor, MI (US); W. Jim Fish, Bloomfiled Hills, MI (US); John M. Rauschenberger, Dearborn, MI (US); Staci L. Johnson, Dearborn, MI (US); Tamara L. McDaniel, Novi, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/437,122

(22) Filed: Nov. 10, 1999

(51) Int. Cl.[7] ................................................ G06F 17/60
(52) U.S. Cl. ......................... 705/11; 345/705; 345/709
(58) Field of Search ............................ 705/11; 434/365, 434/236, 322, 433; 345/709, 705

(56) References Cited

U.S. PATENT DOCUMENTS

| | | | | |
|---|---|---|---|---|
| 4,671,772 A | * | 6/1987 | Slade et al. .................. | 434/219 |
| 5,602,982 A | * | 2/1997 | Judd et al. ................... | 345/709 |
| 5,795,155 A | * | 8/1998 | Morrel-Samuels .......... | 434/107 |
| 5,924,072 A | * | 7/1999 | Havens .......................... | 705/1 |
| 5,926,794 A | * | 7/1999 | Fethe ........................... | 705/11 |
| 5,987,443 A | * | 11/1999 | Nichols et al. ............... | 706/11 |
| 5,991,595 A | * | 11/1999 | Romano et al. ............ | 434/353 |
| 6,085,184 A | * | 7/2000 | Bertrand et al. .............. | 706/45 |
| 6,119,097 A | * | 9/2000 | Ibarra .......................... | 705/11 |
| 6,457,975 B1 | * | 10/2002 | Miranda et al. ............ | 434/236 |

OTHER PUBLICATIONS

Tziner et al. "Investigation of raters' and ratees' reactions to three methods of performance appraisal: BOS, BARS, and GRS," Revue Canadienne des Sciences de l'Administration, Dec. 1997. [retrieved from Proquest].*

Holtz. "Strategizing a human resources presence on the Internet," Compensation & Benefits Management, Autumn 1997. [retrieved from Proquest].*

Fink et al. "Training as a performance appraisal improvement strategy," Career Development International, 1998. [retrieved from Proquest].*

"HR Software Pioneer Criterion Announces New WebBased Human Resource Planning Software," Business Wire, May 20, 1998. retrieved from Proquest].*

Lumpur et al. "The essential requirements of an effective appraisal system," New Straits Times, Sep. 14, 1998. [retrieved from Proquest].*

Hamilton, Martha. "Mantra for a Company Man; New Age Approaches Increasingly Popular in Management Training," The Washington Post, Jun. 30, 1996. [retrieved from Proquest].*

"Geac SmartStream Delivers New Self–Service Web Application for Human Resources," Business Wire, Jun. 29, 1998. [retrieved from Proquest].*

(List continued on next page.)

Primary Examiner—Tariq R. Hapiz
Assistant Examiner—C. Michelle Colon
(74) Attorney, Agent, or Firm—David B. Kelley

(57) ABSTRACT

A method of rating employee performance includes: a) receiving a list of nominated raters from the employee, including at least one manager of the employee, a plurality of the employee's peers, and a plurality of the employee's direct reports; b) electronically soliciting and receiving manager approval of the list of nominated raters; c) electronically notifying the approved raters with instructions for rating the employee; and d) receiving employee ratings data from the approved raters, wherein the steps of electronically soliciting and electronically notifying are automated. The process also includes training all users of the system in a manner in which the ratings are calibrated by comparing case studies to specific behavioral examples to provide immediate feedback to the user in a training process which is fully automated.

12 Claims, 22 Drawing Sheets

OTHER PUBLICATIONS

Hucke, Mark. "Auckland firm unveils electronic staff review," Dominion, Sep. 14, 1998. [retrieved from Proquest].*

Poe, Randall. "Fast forward," Across the Board, Jul./Aug. 1998. [retrieved from Proquest].*

Longenecker et al. "Performance Appraisal Effectiveness: A Matter of Perspective," S.A.M. Advanced Management Journal, Spring 1992. [retrieved from Proquest].*

Arvey et al. "Performance evaluation in work settings," Annual Review of Psychology, 1998. [retrieved from Proquest].*

Boice et al. "Designing effective performance appraisal systems" Work Study, 1997. [retrieved from Proquest].*

Yehuda et al. "Multi-source performance appraisal: An empirical and methodological note," Public Administration Quarterly, Spring 1993. [retrieved from Proquest].*

Bracken et al. "High-tech 360," Training & Development, Aug. 1998. [retrieved from Proquest].*

Hauenstein et al. "From Laboratory to Practice: Neglected Issues in Implementing Frame-of-Reference Rater Training," 1989. [retrieved from Proquest].*

* cited by examiner

360° Leadership Assessment Training
Assess Case Studies

Read the case study below and provide ratings on the three leadership behaviors following the case study.
(use the scroll bar at right to move down the page)

Case Study: Integrity, Courage, Durability
You have been nominated to rate one of your direct reports, Ben. The following business scenario describes a single series of events, but the Leadership Behaviors demonstrated by Ben are representative of the behaviors that he has displayed throughout the year.

Eight months ago, Ben was asked to take the lead in a very important, high profile project. Although he had some concerns about the complexity of the project and the involved workload, he willingly accepted quickly learned what he needed to know. Under Ben's direction, the project got off to a great start and, despite obstacles and resistance, stayed on course right up to the final week. Ben and his team had designed and were planning to implement a new process that would set industry standards if it was successful. This process was to replace a system that had been in place in the company for years, and recommending a change was clearly a risk. Ben's team had done enough benchmarking and testing to conclude that, if managed carefully, the benefits would far outweigh the risks.

The week before completion, Ben called a meeting with his Director. 'How's the project going, Ben?' he asked. 'That's what I need to talk to you about,' Ben replied. 'Everyone's all set to go ahead with it, but we've just identified a possible problem with the technology we're using to support the process there

--- postpone the release. But we would be jeopardizing quality and customer satisfaction if we go through with it. I strongly recommend that we delay our timing despite the embarrassment it will cause my department. We've already started working on a solutions but I'm not sure how much time we'll need.'

Please click a number to provide your rating for each behavior. Refer to the Scaled Behavioral Examples to help develop your ratings.

Integrity (Does the right thing)

| Go To Scaled Behavior Example | Ineffective ① | ② | Somewhat Effective ③ | ④ | Effective ⑤ | ⑥ | Very Effective ⑦ | ⑧ | Role Model ⑨ |

Courage (Takes action in the face of challenge)

| Go To Scaled Behavior Example | Ineffective ① | ② | Somewhat Effective ③ | ④ | Effective ⑤ | ⑥ | Very Effective ⑦ | ⑧ | Role Model ⑨ |

Durability (Perseveres despite hardship)

| Go To Scaled Behavior Example | Ineffective ① | ② | Somewhat Effective ③ | ④ | Effective ⑤ | ⑥ | Very Effective ⑦ | ⑧ | Role Model ⑨ |

360 Home Page | Training Menu

*Fig. 8*

360° Leadership Assessment Training
Explanation of Targeted Range
*Integrity (Does the right thing)*

Case Study

..."That's what I need to talk to you about," Ben replied. "Everyone's all set to go ahead with it, but we've just identified a possible problem with the technology we're using to support the process there appears to be a compatibility issue in some of the far east countries. I've taken steps to ensure that this type of oversight doesn't happen again, but that doesn't help us now. ...

..."But Ben, we announced the launch date last week and the implementation plan is already in motion", the Director said vehemently. "I know this isn't going to look good." Ben replied. "We've come up with a quick fix if we absolutely can't postpone the release. But we would be jeopardizing quality and customer satisfaction if we go through with it. I strongly recommend that we delay our timing despite the embarrassment it will cause my department. We've already started working on a solution but I'm not sure how much time we need."

Scaled Behavioral Examples

Very Effective     Role model

*7 - 9*

- Tells the truth when it is difficult to do so, or when the truth will be unwelcome.
- Works to ensure that results never come at the expense of doing the right thing.
- Acts consistently - in public and in private - with what one says is important
- Makes tough decisions and sticks by them - because it's right for Ford - despite resistance, career risk or personal cost.

Click [ Previous ] to return to continue Training

*Fig. 10*

360° Leadership Assessment Process

Rater: Staci Johnson (SJOHNS29)

INSTRUCTIONS

To rate a behavior click on behavior at left.
OR
For more detailed instructions click here >>  [Detailed Instructions] — 156

WARNING: Use of the "Previous" or "Back" options may require that previously entered data be re-entered. In addition, logging off of the system prior to submitting all ratings will result in lost data.

Click here to cancel and return to home page >>> [Cancel]

- Previous
- Integrity — 132
- Courage — 134
- Durability — 136
- People Development — 138
- Teamwork — 140
- Communication — 142
- Desire to Serve — 144
- Drive for Results — 146
- Systemic Thinking — 148
- Business Acumen — 150
- Innovation — 152
- Quality Methods
- Comments (optional)
- View/Rate all Behaviors — 154
- Instructions
- Ready to Submit

Fig. 18

360° Leadership Assessment Process

◁ Previous

If you have questions, please call the 360' Help Desk at (313)84-55687 (US Based) or send a note to 360LAP.

INSTRUCTIONS

1. For each employee you are selected to rate, click on a leadership behavior at the far left side of the screen. A brief definition of that behavior and a nine-point scale will appear.
2. Click on the appropriate rating 1 through 9 or NR (if you are not able to provide a valid assessment of a certain behavior). After you click on the appropriate rating, the next behavior in the sequence will automatically appear. If you wish to rate the behaviors in a different order than they are currently arranged, simply click on the behavior you wish to rate on the left of the screen.
3. When all the behaviors have been rated, you will have the opportunity to provide written comments on Leadership behavior strengths and areas for improvement. This section of the assessment is optional. Comments will be sent (exactly as written) to the person being rated, but will NOT be sent to their manager. All comments should be constructive and based on job-related behaviors.
4. As you consider your ratings, keep the following in mind:
   - Examples of leadership behaviors, and how they fit into the rating scale, can be viewed by clicking on the "Go to Scaled Behavior Example" button on the rating screen.
   - Base your ratings on specific, observable actions - what the employee actually did over the past year, rather than what you think he or she is capable of doing now or has potential to do in future.
   - Consider how often you have observed the specific behaviors throughout the year.
5. Once you complete the assessment, your results will be sent to an outside vendor. No record of your ratings or comments will remain at Ford.
6. The vendor will aggregate the results for each category of raters (eg. reports, work partners) and prepare a confidential summary for each person being rated and for his or her manager. Your specific ratings will be anonymous.

Click [ Previous ] to return to rating form

158

360° Leadership Assessment Process

Person Being Rated:  Rater: Staci Johnson (SJOHNS29)

Please click on the number that identifies your ratings for each behavior or click on behavior for definition. You may Submit or Cancel.

| | Not Able to Rate | Ineffective | Somewhat Effective | Effective | Very Effective | Role Model | | |
|---|---|---|---|---|---|---|---|---|
| Integrity | NR | ① | ② | ③ | ④ | ⑤ | ⑥ | ⑦ | ⑧ | ⑨ |
| Courage | NR | ① | ② | ③ | ④ | ⑤ | ⑥ | ⑦ | ⑧ | ⑨ |
| Durability | NR | ① | ② | ③ | ④ | ⑤ | ⑥ | ⑦ | ⑧ | ⑨ |
| People Development | NR | ① | ② | ③ | ④ | ⑤ | ⑥ | ⑦ | ⑧ | ⑨ |
| Teamwork | NR | ① | ② | ③ | ④ | ⑤ | ⑥ | ⑦ | ⑧ | ⑨ |
| Communication | NR | ① | ② | ③ | ④ | ⑤ | ⑥ | ⑦ | ⑧ | ⑨ |
| Desire to Serve | NR | ① | ② | ③ | ④ | ⑤ | ⑥ | ⑦ | ⑧ | ⑨ |
| Drive for Results | NR | ① | ② | ③ | ④ | ⑤ | ⑥ | ⑦ | ⑧ | ⑨ |
| Systemic Thinking | NR | ① | ② | ③ | ④ | ⑤ | ⑥ | ⑦ | ⑧ | ⑨ |
| Business Acumen | NR | ① | ② | ③ | ④ | ⑤ | ⑥ | ⑦ | ⑧ | ⑨ |
| Innovation | NR | ① | ② | ③ | ④ | ⑤ | ⑥ | ⑦ | ⑧ | ⑨ |
| Quality Methods | NR | ① | ② | ③ | ④ | ⑤ | ⑥ | ⑦ | ⑧ | ⑨ |

Click [Ready to Submit] or to quit and return to home page click [Cancel]

Fig. 20

METHOD OF RATING EMPLOYEE PERFORMANCE

TECHNICAL FIELD

The present invention provides a method of rating employee performance which is completely automated and performed electronically via an intranet and electronic message system.

BACKGROUND OF THE INVENTION

Typically, employee ratings for large companies are performed in writing on paper evaluation forms, and the evaluation forms are collected, and the data is compiled and analyzed. Obviously, this is a labor-intensive process, and therefore costly to the company.

Another problem associated with standard employee ratings for large companies is that little or no training or instructions are provided regarding the expected ratings criteria. The training of every employee of a large corporation in the ratings process would require large scale efforts, including large training seminars, which may be costly, especially for multi-national corporations. As a result of the absence of training or instructions relating to the expected ratings criteria, the actual employee ratings received may vary dramatically, and may not necessarily accurately reflect performance of employees to enable accurate comparison to other employees throughout the company. For example, two employees having equal talents may be given inconsistent ratings, or a poor employee may be rated higher than a good employee.

It is therefore desirable to provide an improved method of rating employees and training the employees in relation to the expected rating criteria.

DISCLOSURE OF INVENTION

The present invention overcomes the above referenced shortcomings of prior art employee rating systems by providing a web-based system in which a company intranet and electronic messaging system are used to train employees in the ratings process and to facilitate the employee ratings process in a manner which is fully automated and in which performance feedback is used to calibrate ratings to improve the accuracy, and therefore the usefulness, of the ratings received.

More specifically, the present invention provides a method of rating employee performance including: a) receiving a list of nominated raters from the employee, including at least one manager of the employee, a plurality of the employee's peers, and a plurality of the employee's direct reports; b) electronically soliciting and receiving manager approval of the list of nominated raters; c) electronically notifying the approved raters with instructions for rating the employee; and d) receiving employee ratings data from the approved raters, wherein the steps of electronically soliciting and electronically notifying are automated.

Another aspect of the invention provides a method of electronically training employees to rate performance of other employees, including: a) displaying a case study behavioral example to the employee; b) receiving case study behavioral ratings data from the employee; and c) calibrating ratings performed by the employee by displaying targeted ratings for the case study for which data has been received from the employee in order to provide immediate feedback to the employee regarding ratings criteria.

Accordingly, an object of the invention is to provide an improved method of rating employee performance in which accuracy and usability of the ratings results are improved.

Another object of the invention is to provide a method of training employees to rate other employees in a manner in which the ratings are calibrated to improve the accuracy of the ratings process.

Another object of the invention is to provide a fully automated employee ratings system in which employees may select raters, and the selected raters may rate the employees in a fully automated electronic process.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 8 is a computer screen display of a particular case study;

FIG. 10 is a computer screen display correlating scaled behavioral examples with a case study;

FIG. 17 is a computer screen display illustrating behavior rating options;

FIG. 18 is a computer screen display illustrating instructions followed by clicking on the "detailed instructions" icon of FIG. 17;

FIG. 20 is a computer screen display illustrating the selected ratings for the employee;

BEST MODE FOR CARRYING OUT THE INVENTION

The present invention provides a method of collecting feedback systematically regarding an employee's leadership behaviors from multiple sources, including managers, direct reports, and work partners. The invention consists of a web-based training process, rater nomination, ratings based upon is leadership behaviors, and evaluation of the ratings data. The entire process is automated, and includes an automated training procedure with automated calibration of ratings for improved accuracy.

Figure 1:
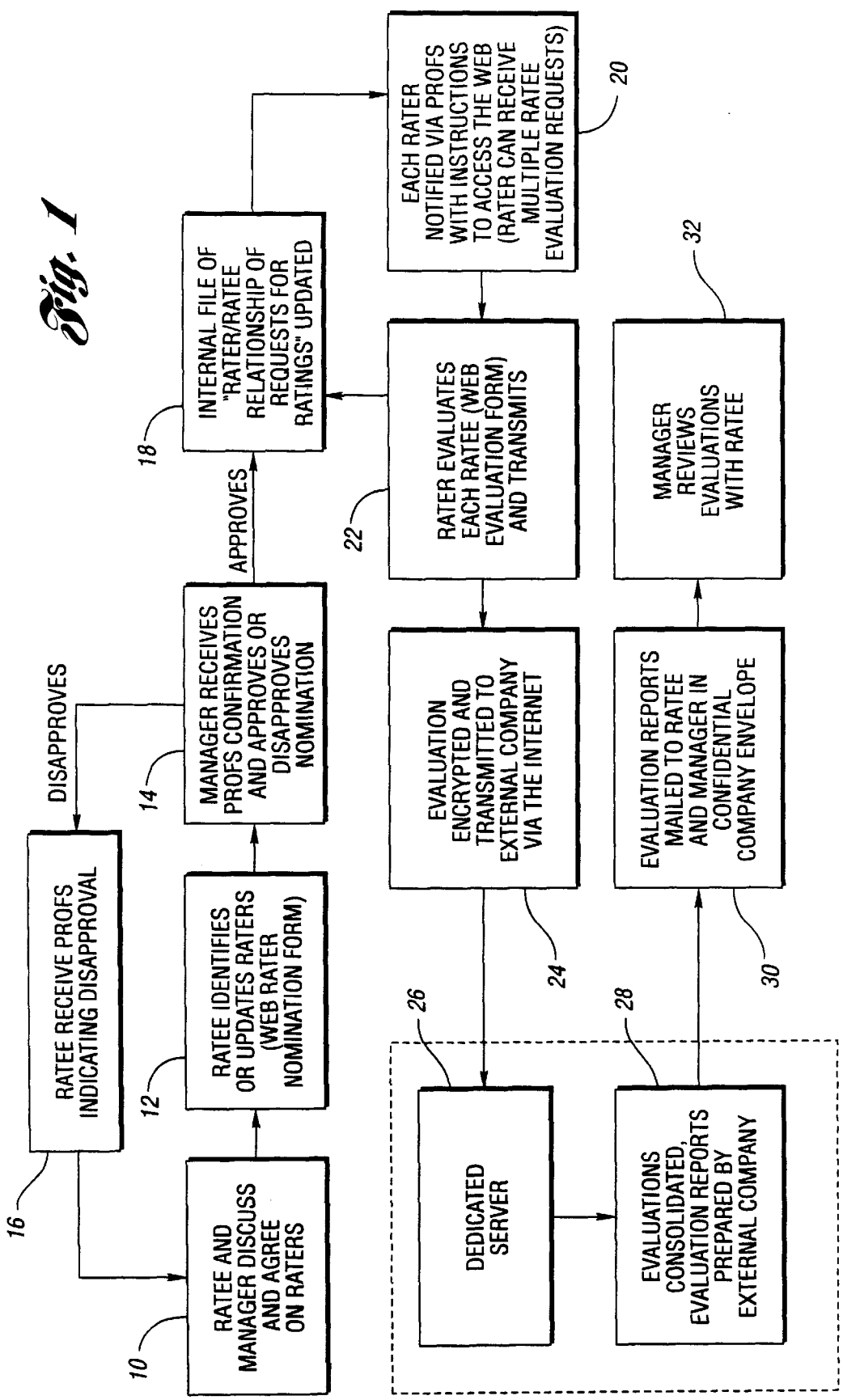
FIG. 1 shows a schematic flow diagram of a ratings system in accordance with the present invention.

Referring to FIG. 1, the ratings process is illustrated schematically. At step 10, the ratee and manager discuss and agree on raters. At step 12, the ratee (employee being rated) identifies or updates raters on a web-based rater nomination form. At step 14, the manager automatically receives an electronic message with the list of rater nominees, and approves or disapproves the nominations. This automation is accomplished by providing the system operating software on a common intranet with the electronic messaging system, and linking the two electronically. If the manager disapproves, at step 16 the ratee receives an electronic message indicating the disapproval, and returns to step 10. If the manager approves the nominations at step 14, an internal file of "rater/ratee relationship of requests for ratings" is updated, and at step 20 each rater is automatically notified via an electronic message with instructions to access an intranet web in order to perform the evaluation.

At step 24, the evaluation is encrypted and transmitted to the dedicated server 26 of an external company via the Internet, and the evaluations are consolidated and evaluation reports prepared by the external company at 28. At step 30, the evaluation reports are mailed to the ratee and the manager, or made available on a website and at step 32 the manager reviews the evaluations with the ratee.

Figure 2:
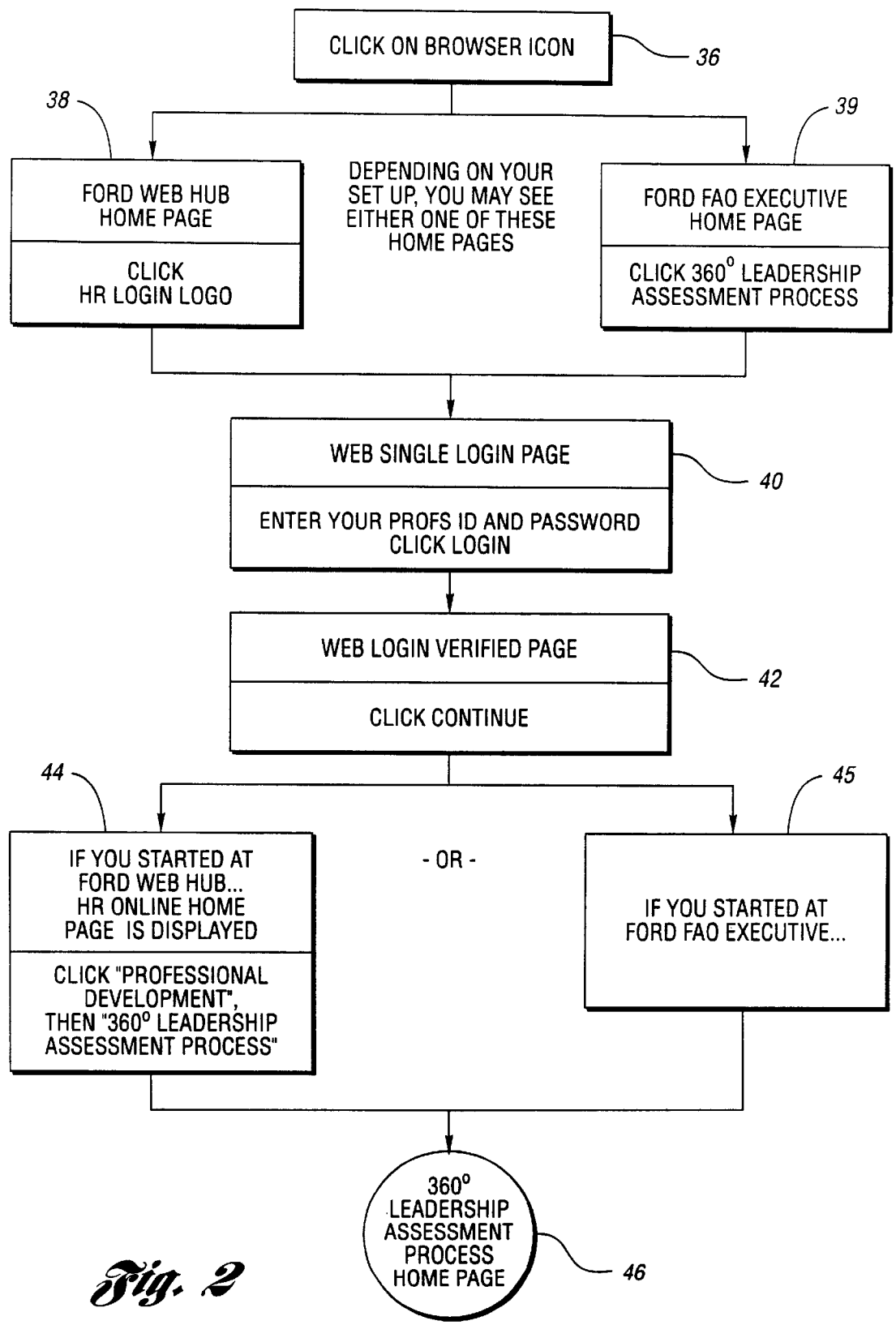
FIG. 2 shows a schematic flow diagram of a preferred method of implementing the present invention.

FIG. 2 illustrates a preferred system by which the ratings software of the present invention may be accessed via the intranet. In the preferred embodiment, the PC is turned on, and the Netscape Navigator icon is selected at step 36. If a web hub home page is next displayed by the PC (step 38), HR Online logo is selected. If an executive home page is displayed (step 39), the leadership assessment process icon is selected. At step 40, a log-in page is displayed, at which point the user would enter his or her Corporate Directory System (CDS) identification and password. At step 42, the log-in is verified, and the "continue" icon is selected. If the process included step 38, then at step 44 "Professional Development" is selected and than "360° Leadership Assessment Process" is selected, and the leadership assessment process home page is displayed at 46. If the process included step 39, then step 46 will already have been reached, and step 45 is skipped.

Figure 3:
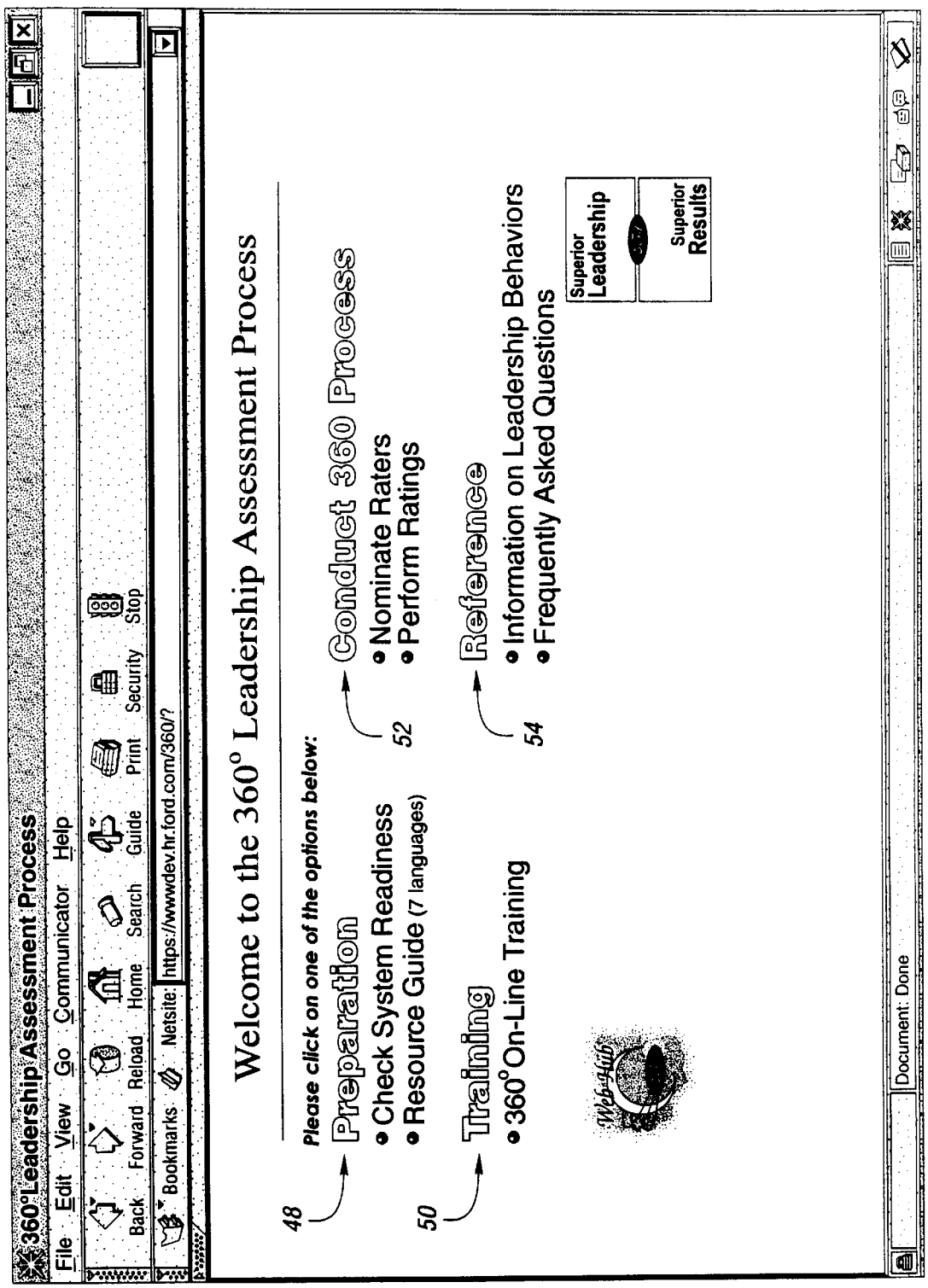
FIG. 3 is a computer screen display of a home page for a software system implementing the present invention.
Figure 4:
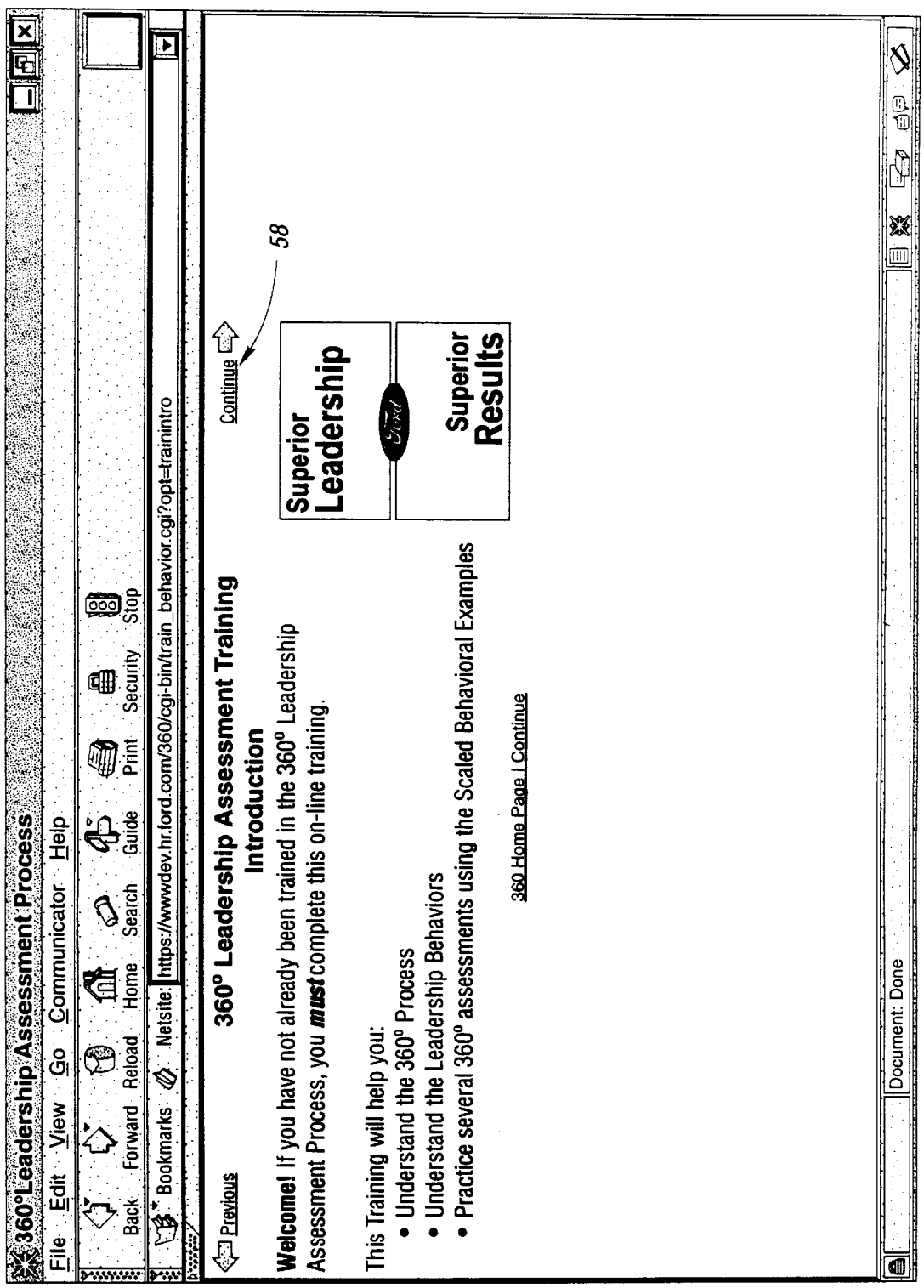
FIG. 4 is a computer screen display illustrated after clicking the "training" icon of FIG. 3.

At step 46 illustrated in FIG. 2, the home page 46 illustrated in FIG. 3 appears. The home page 46 displays the options of preparation 48, training 50, conducting the ratings process 52, and reference information 54. If the "training" icon 50 is selected on FIG. 3, then the training page 56 of FIG. 4 is displayed. If the "continue" icon 58 of FIG. 4 is selected, the training menu 60 of FIG. 5 is displayed.

Figure 5:
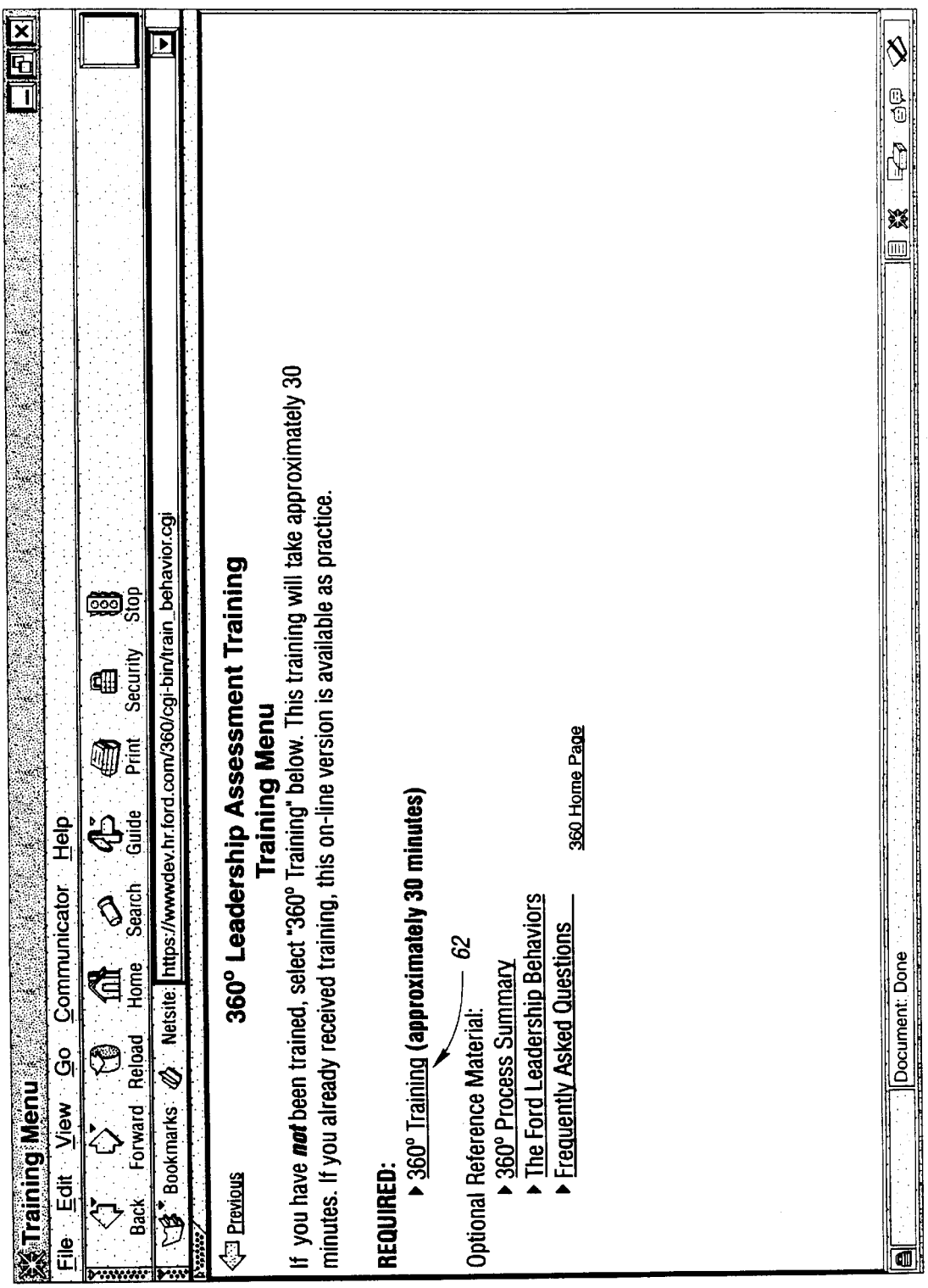
FIG. 5 is a computer screen display illustrated after clicking the "continue" icon of FIG. 4.
Figure 6:
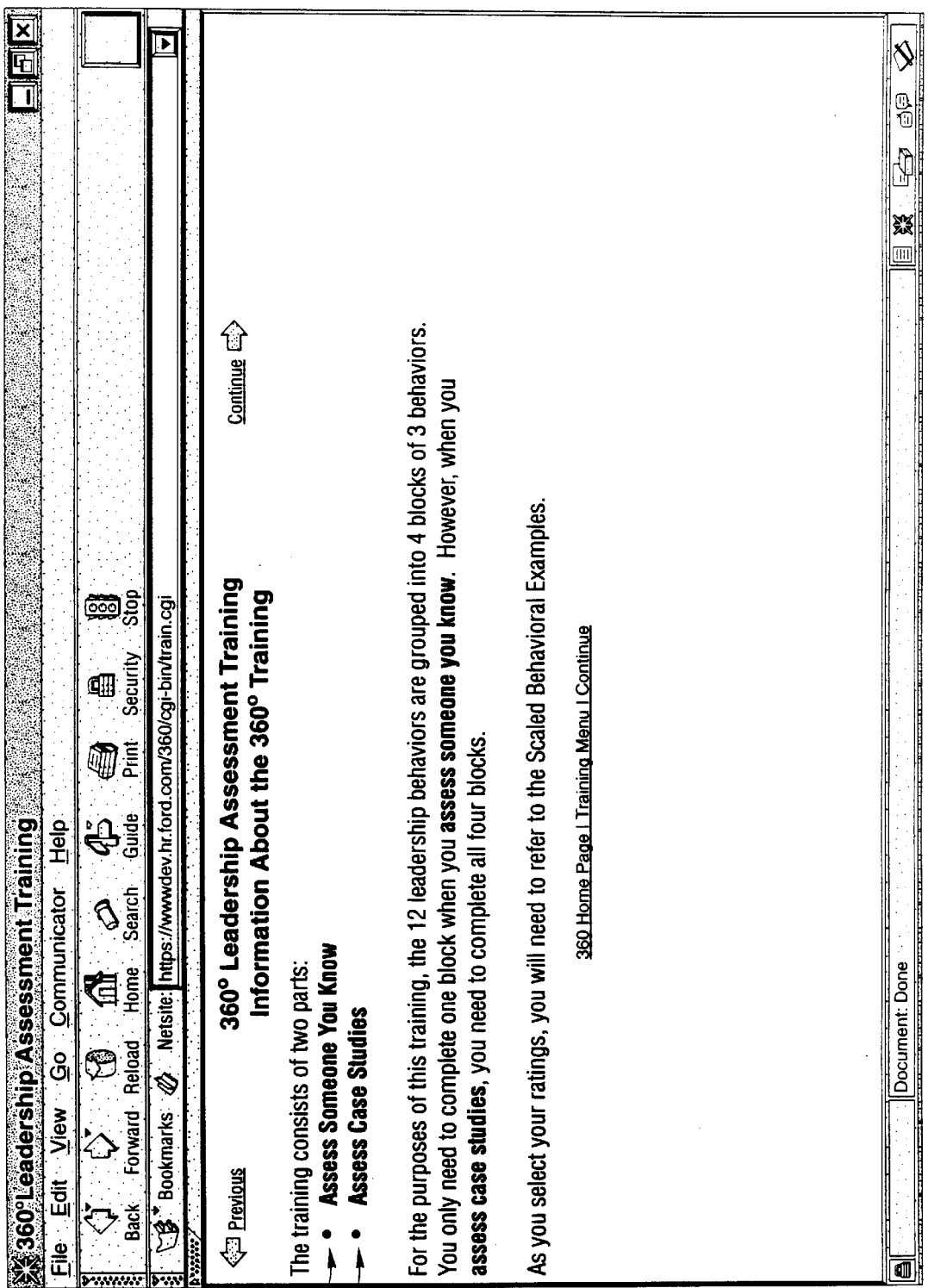
FIG. 6 is a computer screen display illustrating a training menu.
Figure 7:
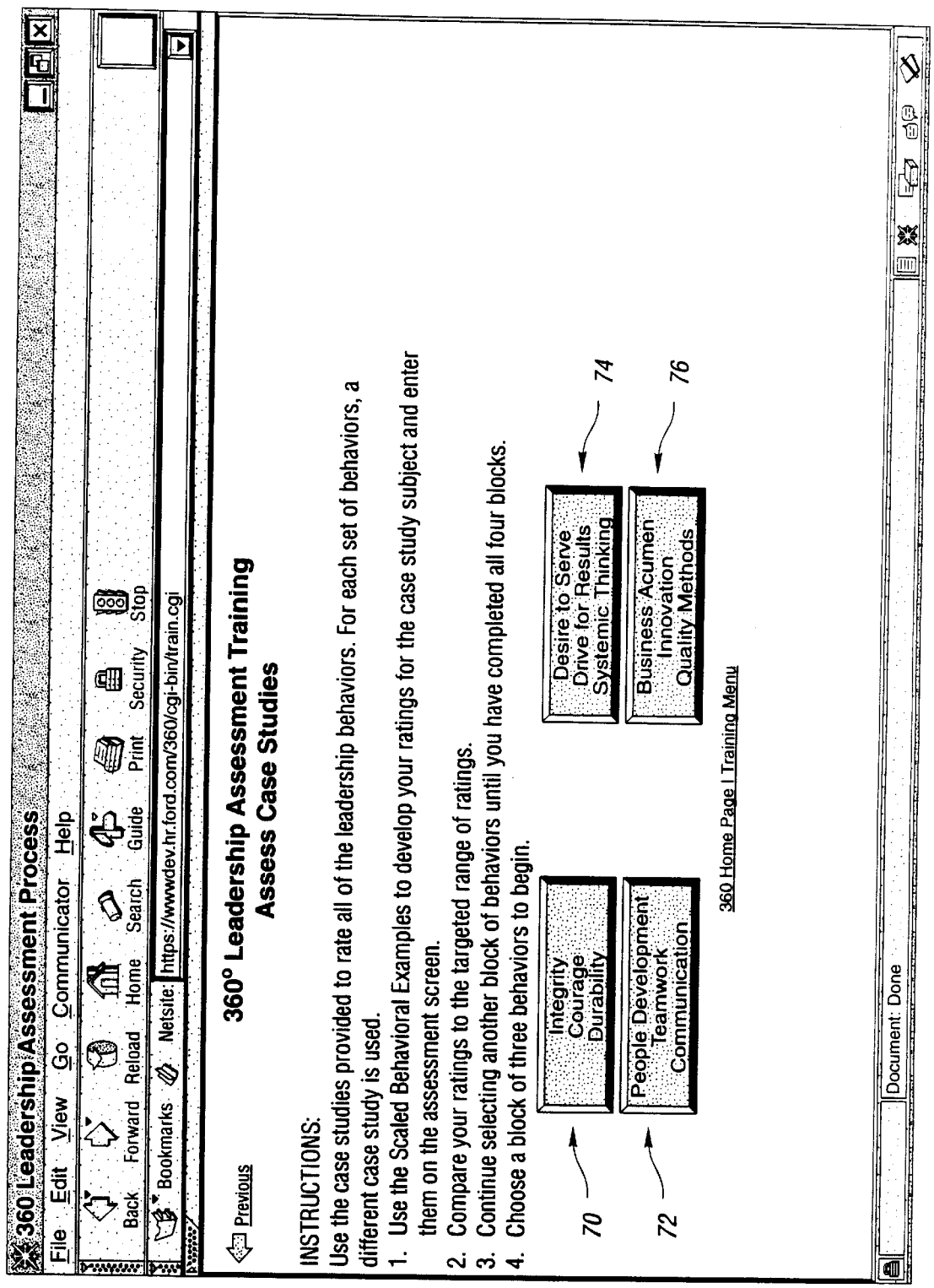
FIG. 7 is a computer screen display providing instructions related to case studies.

If the "360° training" icon 62 is selected in FIG. 5, the training page 64 of FIG. 6 is displayed. The training page 64 provides the options of assessing someone you know 66 and assessing case studies 68. If icon 68 is selected in FIG. 6, the screen display of FIG. 7 will appear. FIG. 7 provides instructions regarding use of the case studies and provides four blocks 70, 72, 74, 76 for initiating the case studies. Behaviors related to integrity, courage and durability correspond with block 70; behaviors related to people development, teamwork and communication correspond with block 72; behaviors related to desire to serve, drive for results, and systemic thinking correspond with block 74; and behaviors related with business acumen, innovation, and quality methods correspond with block 76.

If block 70 is selected, screen display 78 of FIG. 8 is displayed. As shown, screen display 78 includes a specific case study 80 in which a specific story is told with respect to behavior of one or more employees to be evaluated. Below the case study 80, rating options 82, 84, 86 are provided for the behaviors of integrity, courage, and durability, respectively. At this point, the user selects ratings corresponding with each behavior 82, 84, 86. As shown, options 83, 85, 87 are provided related with each behavior 82, 84, 86 to provide a scaled behavior example for the respective behavior.

Figure 9:
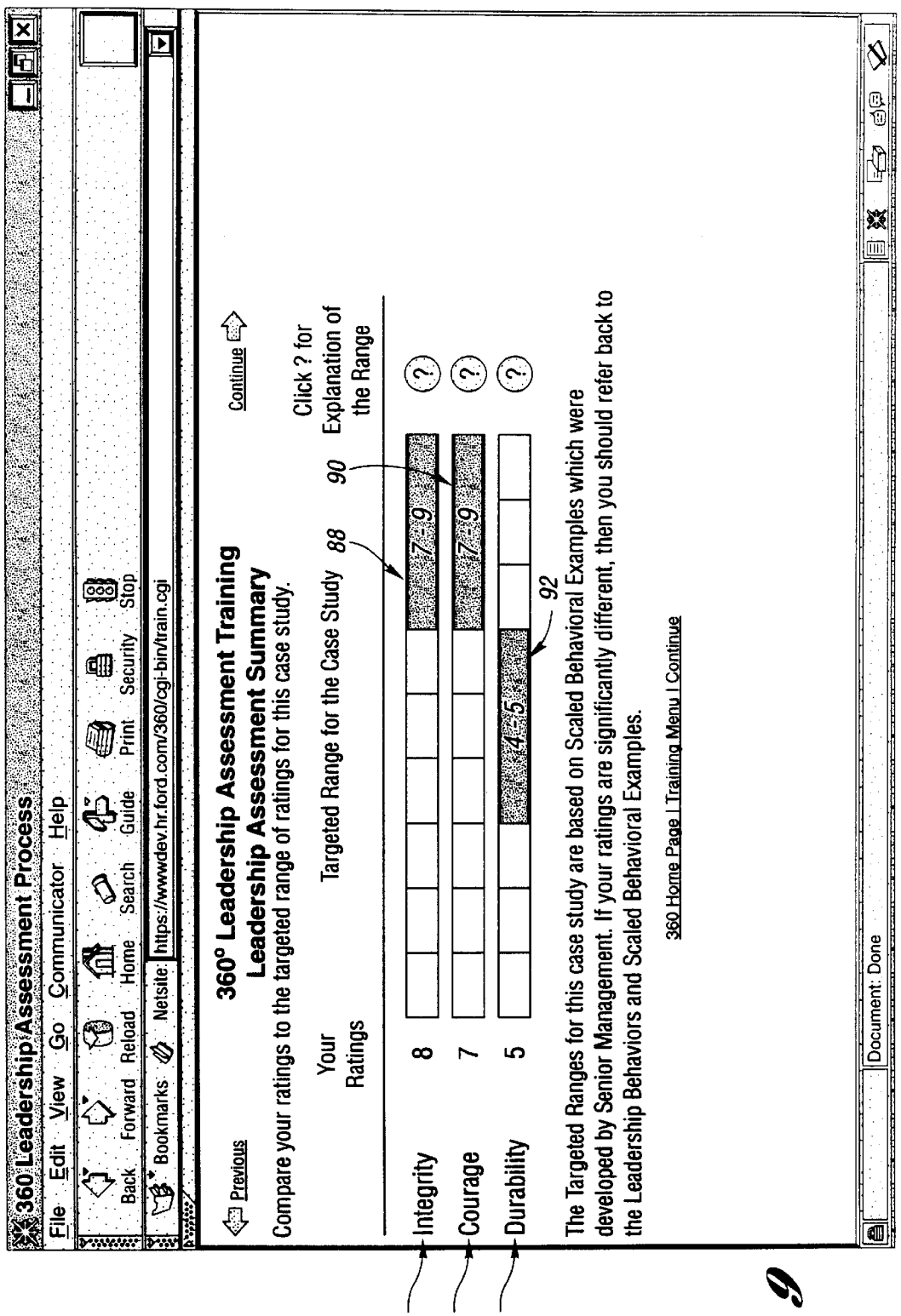
FIG. 9 is a computer screen display comparing the user's ratings with the targeted ratings.

Turning to FIG. 9, the user's ratings are displayed against the targeted ranges 88, 90, 92 for each behavior 82, 84, 86.

Turning to FIG. 10, screen 92 illustrates the calibration method whereby the ratings process is improved based upon feedback. In this screen, a correlation is displayed between specific text 94 of the case study for which data has been received from the employee and the specific scaled behavioral example 96 corresponding with the target ed ratings. As shown, the specific text 94 of the case study behavioral example is highlighted, and an arrow 98 connects the specific text 94 and the specific scaled behavioral examples 96.

In this manner, the user is trained regarding which specific behaviors correspond with specific ratings for each of the leadership behaviors. Similar case studies and scaled behavioral examples are provided for each of the leadership behaviors being rated. Accordingly, the ratings are "calibrated" such that employees exhibiting specific behaviors will be rated consistently. This calibration eliminates much of the subjectivity of known ratings systems.

Figure 11:
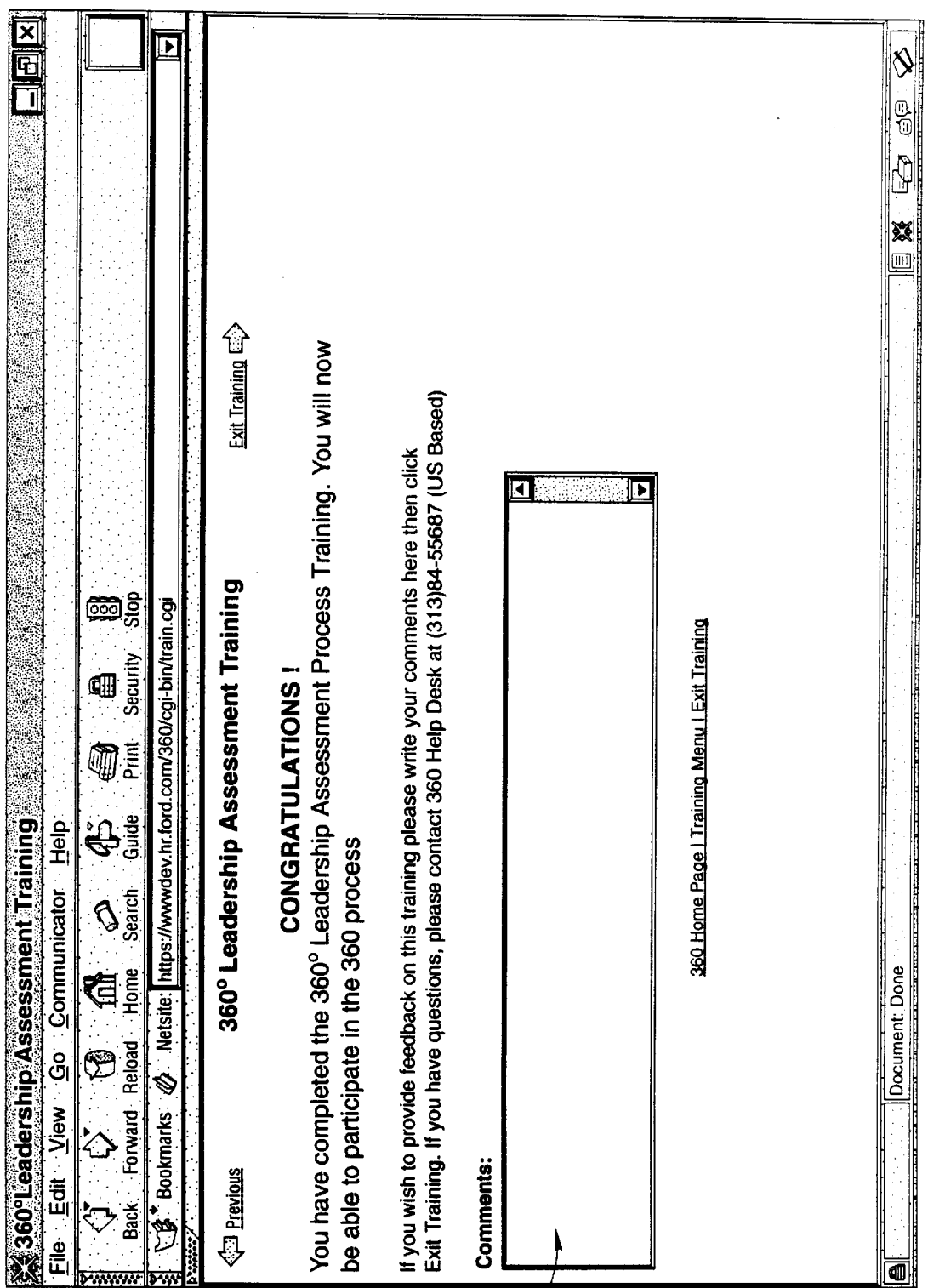
FIG. 11 is a computer screen display ending the training process.

Turning to FIG. 11, screen 100 signifies the end of the training process and a box 102 is provided for submitting feedback regarding the, training process.

Figure 12:
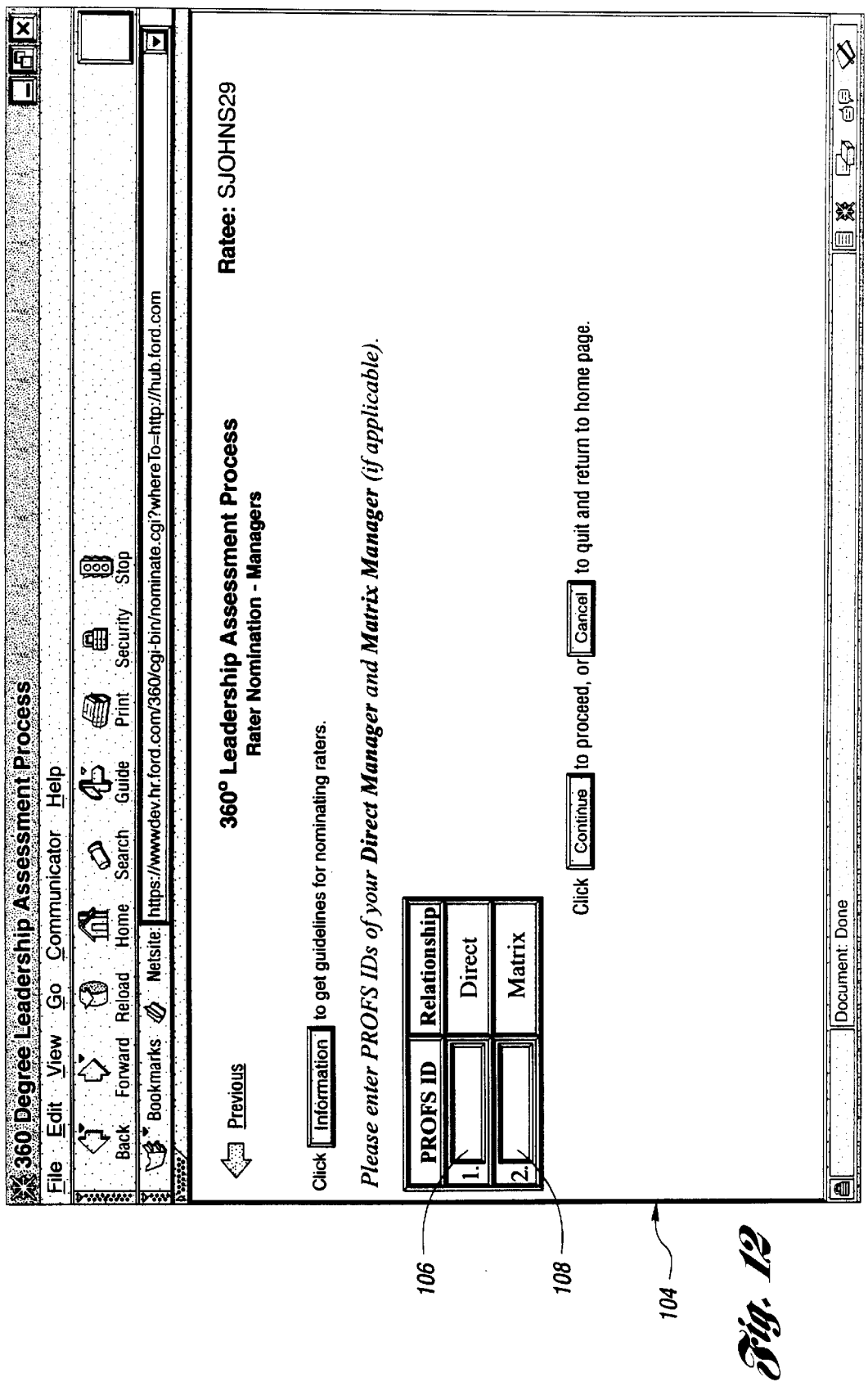
FIG. 12 is a computer screen display of a rater nomination form for managers.
Figure 13:
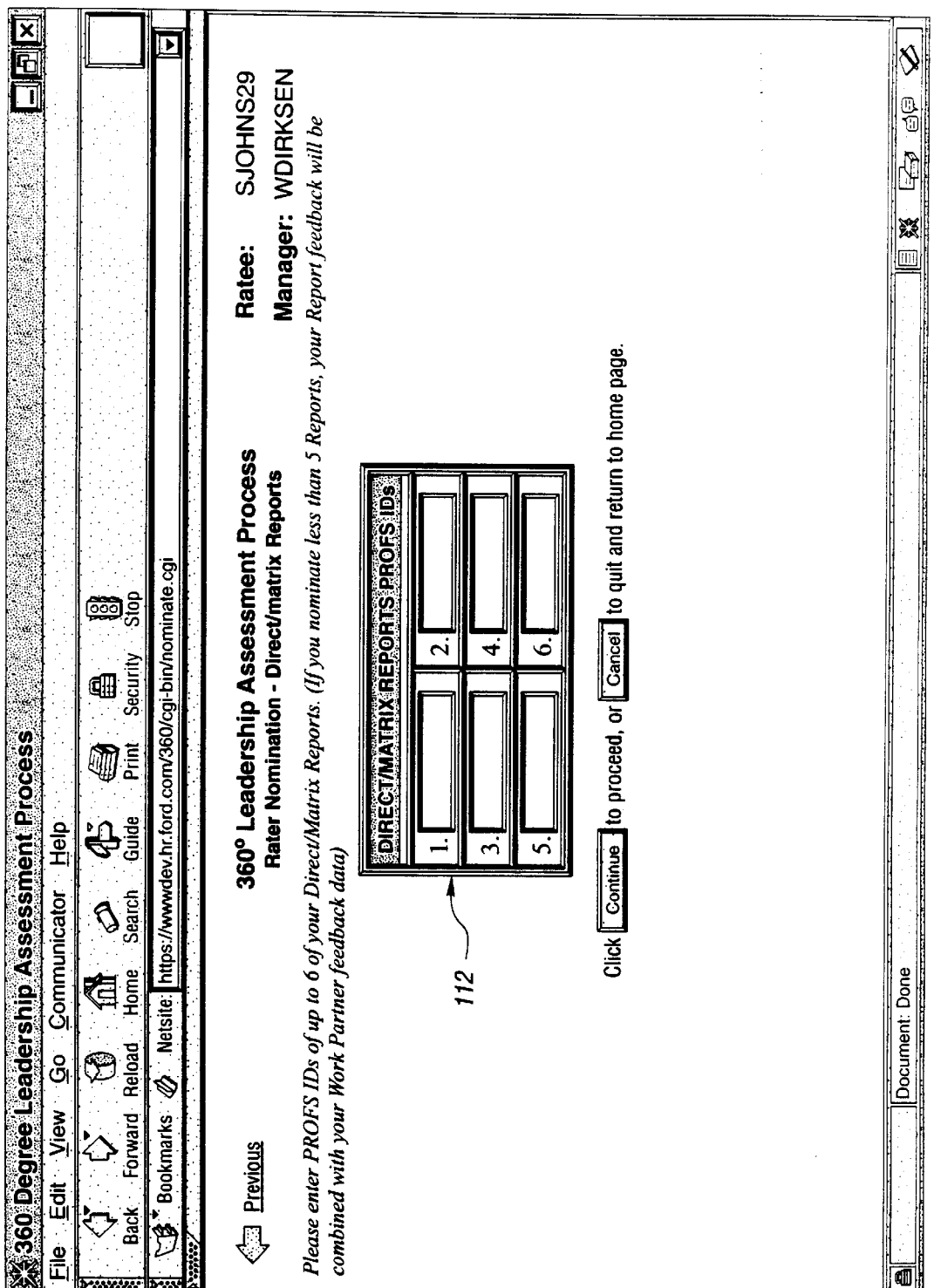
FIG. 13 is a computer screen display of a rater nomination form for direct/matrix reports.

At this point, the user has been properly trained, and the system is flagged so that this particular user now perform ratings. At FIG. 12, screen 104 solicits rater nomination of managers in the PROFS ID locations 106, 108 for direct managers and matrix managers. Screen 110 illustrated in FIG. 13 solicits nomination of raters which are direct reports or matrix reports (i.e., employees who report directly to the user, or employees who are assigned to report to the user in a matrix configuration). PROFS Ids for these raters are entered at box 112 so that the raters can be notified by an electronic messaging system.

Figure 14:
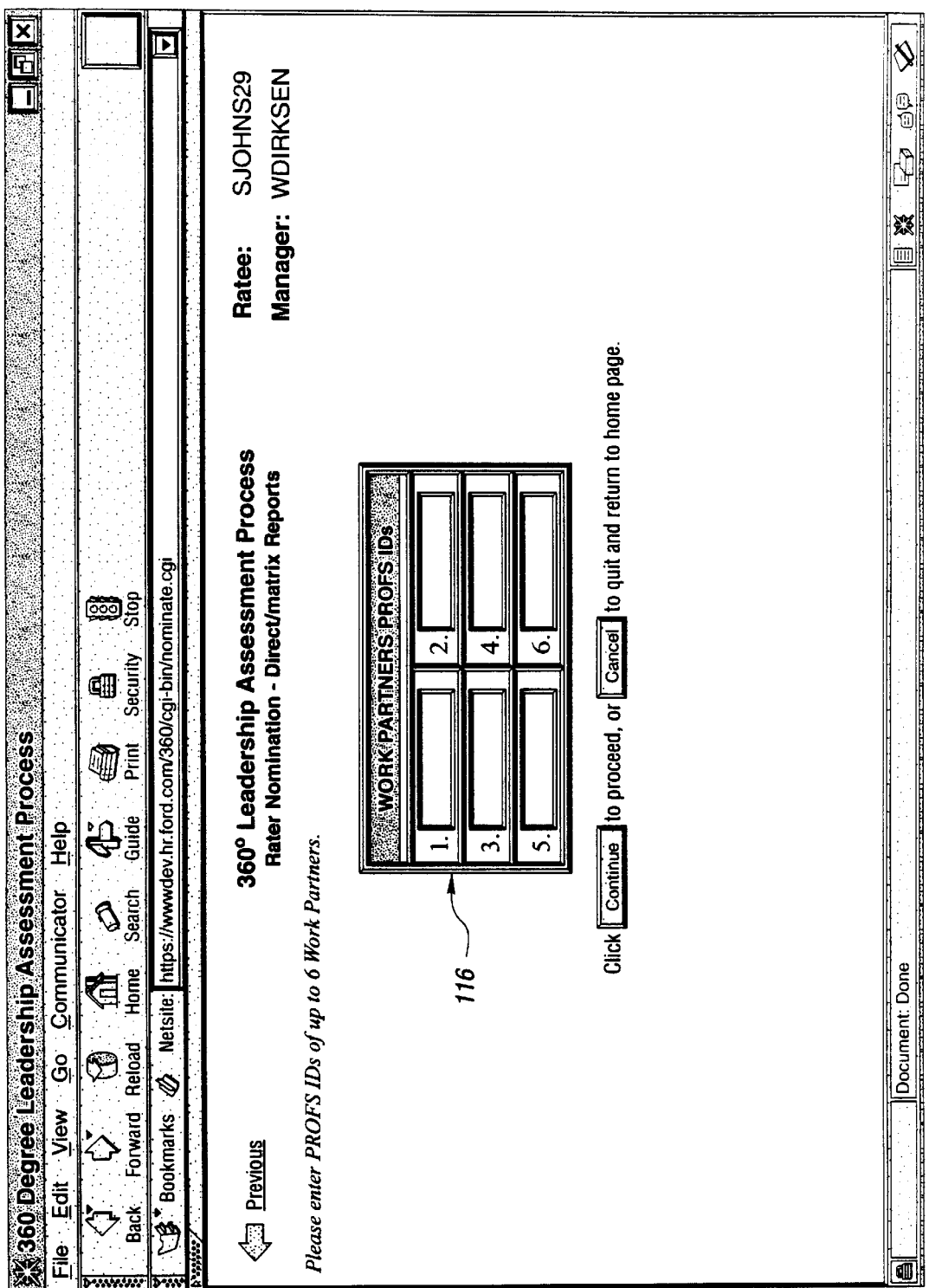
FIG. 14 is a computer screen display of a rater nomination form for work partners.
Figure 15:
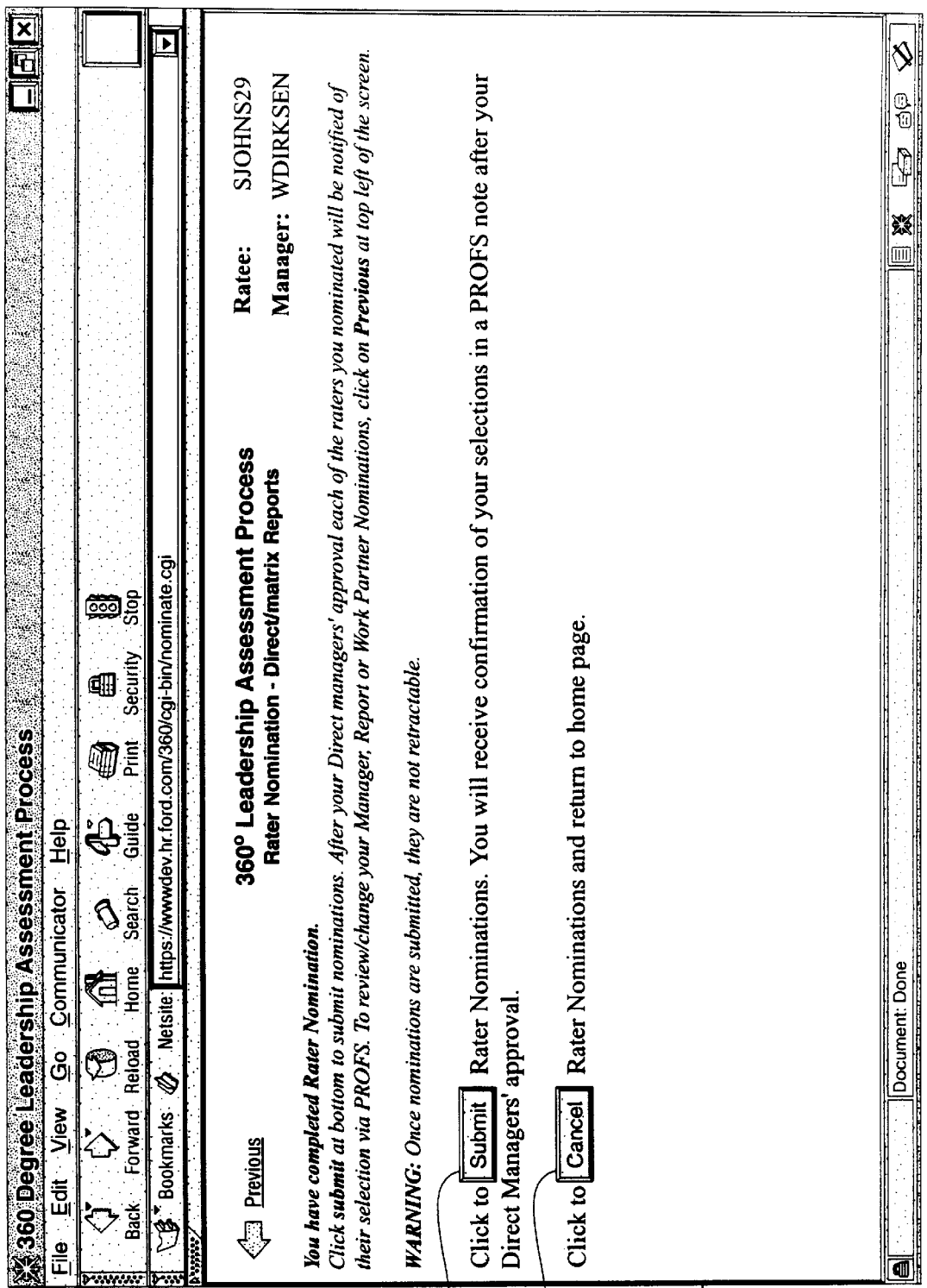
FIG. 15 is a computer screen display used for submitting rater nominations.

Turning to FIG. 14, screen 114 solicits nominations of raters for work partners in box 116. In FIG. 15, screen 118 provides the options of submitting the rater nominations at box 120 or canceling the rater nominations at box 122.

Figure 16:
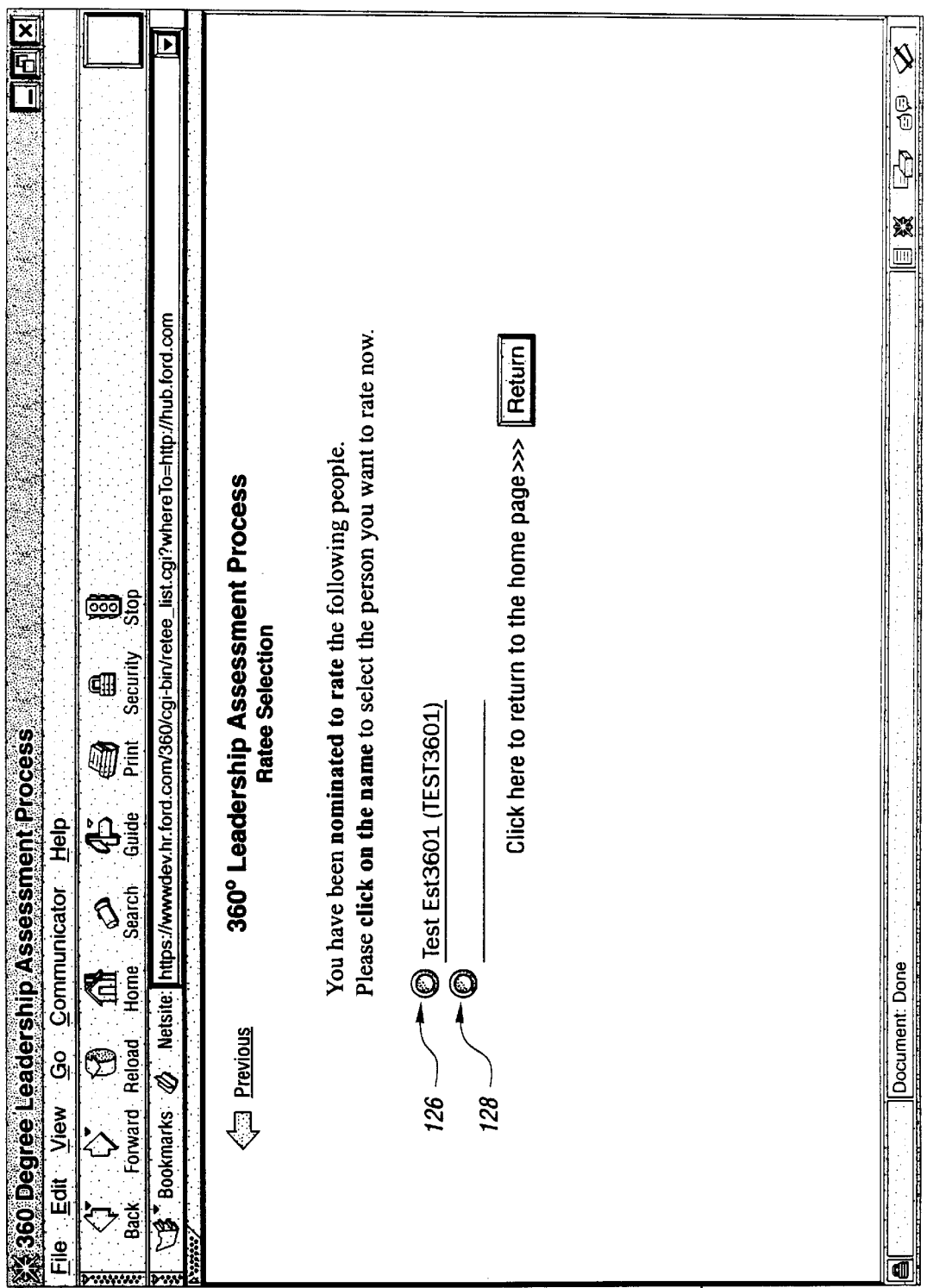
FIG. 16 is a computer screen display initiating the nominated raters' rating process.

Once the rater nominations have been submitted and approved by a manager, the approved raters may initiate the rating process. However, the approved raters must first complete the previously described training process prior to initiating the rating process. Once the training process is completed, the rater may enter the rating system, and referring to FIG. 16, the rater may select from screen 124 the name 126, 128 of the person he or she wishes to rate.

Turning to FIG. 17, screen 130 is then displayed, and the rater may select integrity 132, courage 134, durability 136, people development 138, teamwork 140, communication 142, desire to serve 144, drive for results 146, systemic thinking 148, business acumen 150, innovation 152, or quality methods 154 as a behavior to evaluate. The rater must select all of the behaviors 132–154 to complete the ratings process. Alternatively, the rater may select "detailed instructions" 156, upon which screen 158 illustrated in FIG. 18 will appear. Screen 158 provides detailed instructions for the ratings process.

Figure 19:
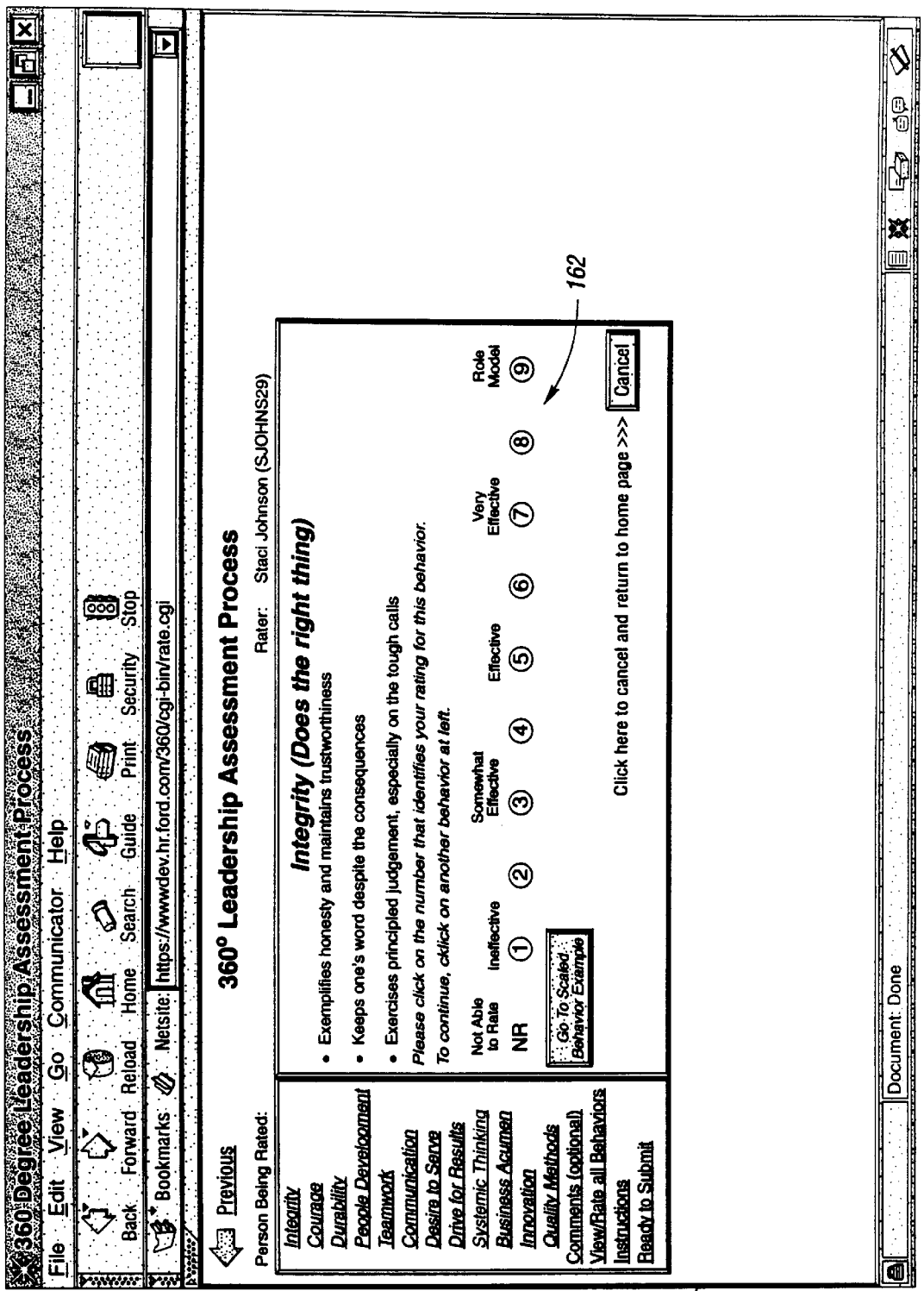
FIG. 19 is a computer screen display used for rating integrity of the employee.

Turning to FIG. 19, if "integrity" 132 is selected from FIG. 17, screen 160 will display the ratings values 162 available for evaluating the ratee.

After each of the behaviors 132, 154 has been selected and the rating values selected, FIG. 20 illustrates screen 164 which will display all of the ratings given to the ratee.

Figure 21:
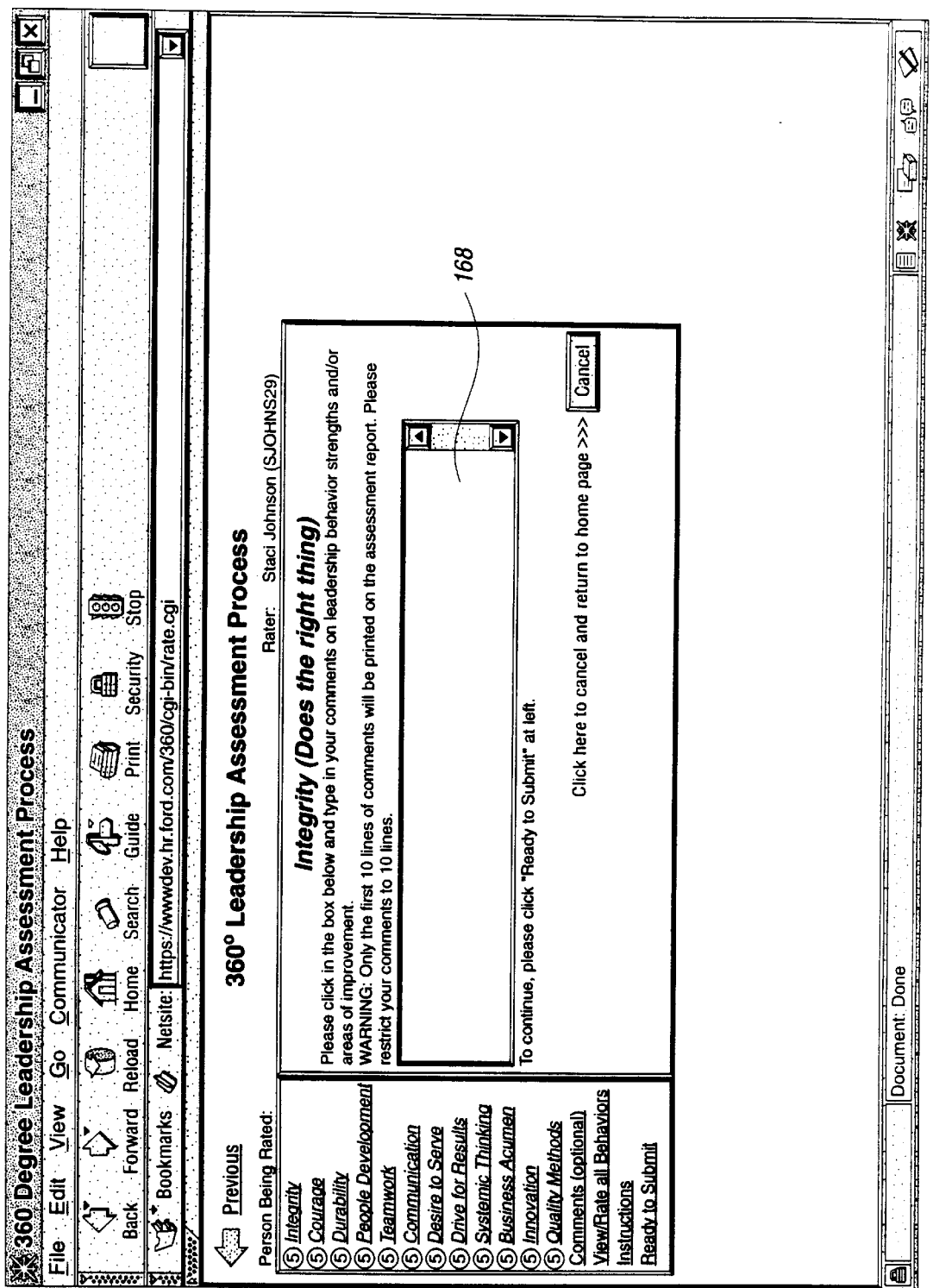
FIG. 21 is a computer screen display soliciting typed comments to be submitted with the numerical ratings.
Figure 22:
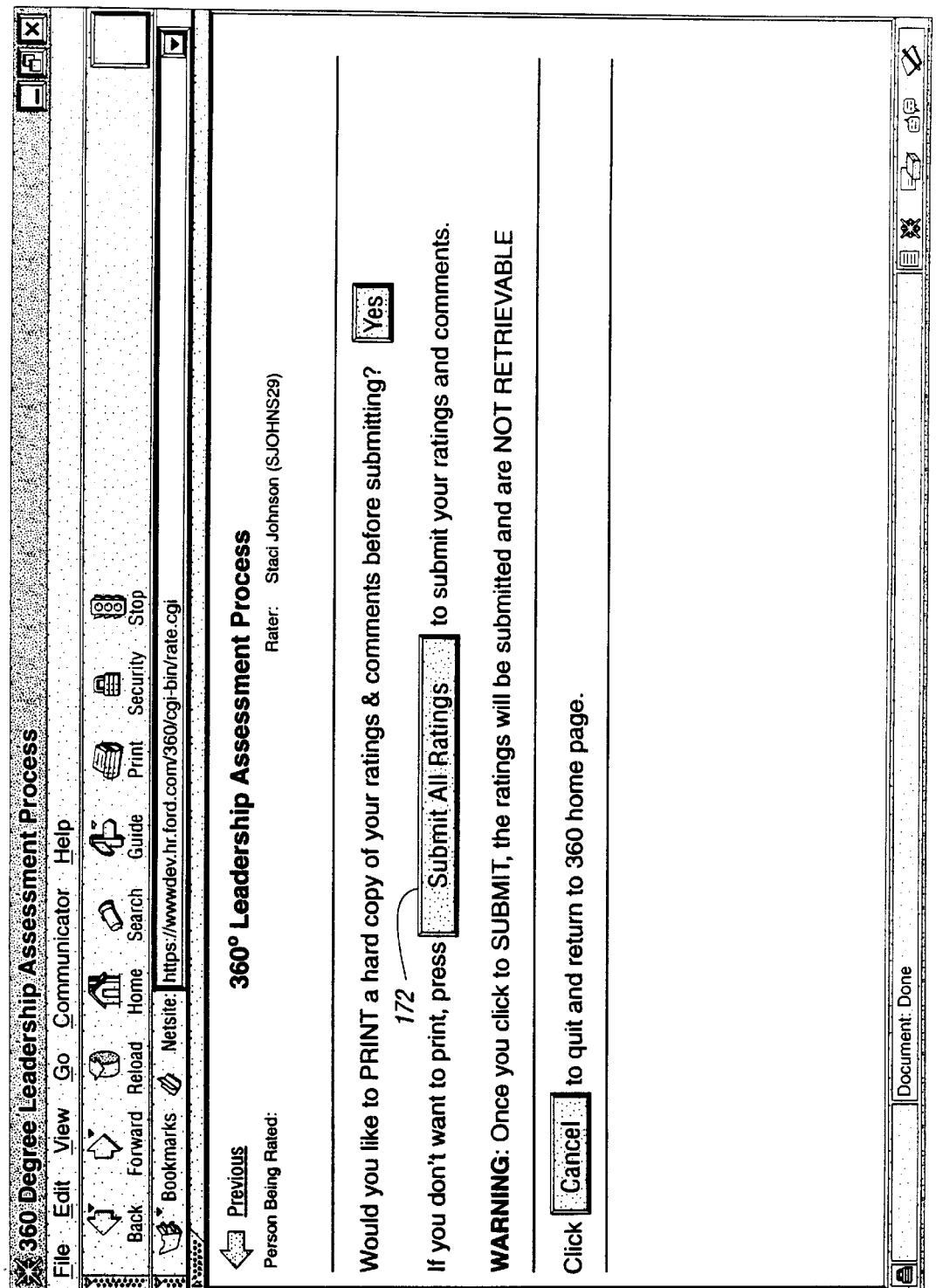
FIG. 22 is a computer screen display, ending the ratings process.

Turning to FIG. 21, screen 166 signifies the end of the ratings process, and box 168 is provided for submitting optional comments regarding the employee being rated. In screen 170 of FIG. 22, all ratings may be submitted by selecting box 172, thus completing the duties of the rater.

Turning back to FIG. 1, the submitted data is then encrypted and transmitted to an external company for evaluation and report preparation, as illustrated at steps 24, 26, 28.

While the best mode for carrying out the invention has been described in detail, those familiar with the art to which this invention relates will recognize various alternative designs and embodiments for practicing the invention within the scope of the appended claims.

What is claimed is:

1. A computer-implemented method for training users to rate employee performance, the method comprising:
   (i) displaying to a user text representing an employee case study behavioral example;
   (ii) receiving from the user data representing one or more employee performance ratings based on the case study behavioral example;
   (iii) displaying to the user data representing a pre-defined target range for one or more of the performance ratings; and
   (iv) automatically displaying to the user a graphical correlation between the pre-defined target range(s) and specific text of the case study behavioral example corresponding to the target range(s), wherein the target range(s) and the graphical correlation are displayed as feedback to train the user to rate employee performance, wherein users that have not completed steps (i) through (iv) are automatically precluded from rating the employee.

2. The computer-implemented method of claim 1 wherein the graphical correlation is an arrow connecting the pre-defined target range(s) and the corresponding specific text of the case study behavioral example.

3. The computer-implemented method of claim 1 wherein the step of displaying to the user a graphical correlation comprises highlighting the specific text of the case study behavioral example corresponding to the target range(s).

4. The computer-implemented method of claim 1 further comprising displaying to the user a comparison between the one or more employee performance ratings received from the user and the target range(s) for the performance rating(s).

5. The computer-implemented method of claim 1 wherein one or more of the performance ratings include leadership behavior ratings.

6. The computer-implemented method of claim 1 wherein users that have not completed steps (i) through (iv) are automatically precluded from rating the employee.

7. A system for training users to rate employee performance, the system comprising one or more computers operably programmed and configured to:
   (i) display to a user text representing an employee case study behavioral example;
   (ii) receive from the user data representing one or more employee performance ratings based on the case study behavioral example;
   (iii) display to the user data representing a pre-defined target range for one or more of the performance ratings; and
   (iv) automatically display to the user a graphical correlation between the pre-defined target range(s) and specific text of the case study behavioral example corresponding to the target range(s), wherein the target range(s) and the graphical correlation are displayed as feedback to train the user to rate employee performance, wherein users that have not completed steps (i) through (iv) are automatically precluded from rating the employee.

8. The system of claim 7 wherein the graphical correlation is an arrow connecting the pre-defined target range(s) and the corresponding specific text of the case study behavioral example.

9. The system of claim 7 wherein the graphical correlation comprises highlighted text of the case study behavioral example corresponding to the target range(s).

10. The system of claim 7 wherein the one or more computers are operably programmed and configured to display to the user a comparison between the one or more employee performance ratings received from the user and the target range(s) for the performance rating(s).

11. The system of claim 7 wherein one or more of the performance ratings include leadership behavior ratings.

12. The system of claim 7 wherein users that have not completed steps (i) through (iv) are automatically precluded from rating the employee.

* * * * *